United States Patent
Lee et al.

(10) Patent No.: US 11,312,257 B2
(45) Date of Patent: Apr. 26, 2022

(54) ROBOT WITH VEHICLE CHARGING

(71) Applicant: Samsung Electronics Co., Ltd., Suwon-si (KR)

(72) Inventors: Jaesup Lee, Yongin-si (KR); KyungSik Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 16/513,762

(22) Filed: Jul. 17, 2019

(65) Prior Publication Data

US 2020/0101855 A1   Apr. 2, 2020

(30) Foreign Application Priority Data

Oct. 1, 2018 (KR) .................. 10-2018-0116897

(51) Int. Cl.
| | |
|---|---|
| *B60L 53/35* | (2019.01) |
| *B60L 53/12* | (2019.01) |
| *G05D 1/02* | (2020.01) |
| *B60L 53/68* | (2019.01) |
| *B60L 53/14* | (2019.01) |

(52) U.S. Cl.
CPC ............ *B60L 53/35* (2019.02); *B60L 53/12* (2019.02); *B60L 53/14* (2019.02); *B60L 53/68* (2019.02); *G05D 1/0276* (2013.01)

(58) Field of Classification Search
CPC .......... B60L 53/35; B60L 53/36; B60L 53/37; B60L 53/12; B60L 53/68; B60L 53/14; G05D 1/0276
See application file for complete search history.

(56) References Cited

U.S. PATENT DOCUMENTS 9,592,742 B1   3/2017  Sosinov et al.

FOREIGN PATENT DOCUMENTS

| | | | |
|---|---|---|---|
| JP | 10-264839 A | 10/1998 | |
| JP | 2017-27213 A | 2/2017 | |
| KR | 10-2012-0102461 A | 9/2012 | |
| KR | 10-2017-0098071 A | 8/2017 | |
| WO | WO-2015126320 A1 * | 8/2015 | .............. B25J 9/009 |

OTHER PUBLICATIONS

WO-2015126320-A1 (Year: 2021).*

* cited by examiner

*Primary Examiner* — David V Henze-Gongola
(74) *Attorney, Agent, or Firm* — NSIP Law

(57) ABSTRACT

A processor-implemented robot control method includes: determining a target position from map information; estimating a candidate region for a current position in the map information based on information sensed by an inertial measurement unit (IMU) and first image information received from an image sensor; estimating the current position in the candidate region based on second image information received from either the image sensor or another image sensor; and controlling a movement of a vehicle charging robot based on the target position and the current position.

23 Claims, 12 Drawing Sheets

ROBOT WITH VEHICLE CHARGING

CROSS-REFERENCE TO RELATED APPLICATIONS

This application claims the benefit under 35 USC § 119(a) of Korean Patent Application No. 10-2018-0116897 filed on Oct. 1, 2018 in the Korean Intellectual Property Office, the entire disclosure of which is incorporated herein by reference for all purposes.

BACKGROUND

1. Field

The following description relates to a robot with vehicle charging.

2. Description of Related Art

A typical electric vehicle can only travel a short distance with a single charge, relative to a fuel-powered vehicle (e.g., a vehicle including an internal combustion engine). Thus, charging convenience is a significant issue for such typical electric vehicle. A charging device provided at a typical charging station is fixed at a predetermined position, and thus a user must move their electric vehicle to the corresponding position for charging, inconveniencing the user. If the charging device is in use by another user, the user must move to find another charging device or wait until the corresponding charging device is available, further inconveniencing the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented robot control method includes: determining a target position from map information; estimating a candidate region for a current position in the map information based on information sensed by an inertial measurement unit (IMU) and first image information received from an image sensor; estimating the current position in the candidate region based on second image information received from either the image sensor or another image sensor; and controlling a movement of a vehicle charging robot based on the target position and the current position.

The method may include charging a target vehicle in response to the vehicle charging robot moving to the target position.

The may include resetting a cumulative error of the IMU based on the current position at a predetermined time interval.

The first image information may include information associated with an object positioned within a first distance from the vehicle charging robot, the second image information includes information associated with an object positioned within a second distance from the vehicle charging robot, and the first distance is greater than the second distance.

The estimating of the candidate region may include: generating a first local map based on the first image information; generating one or more candidate regions for the current position by comparing the first local map to the map information; and selecting the candidate region for the current position from among the one or more candidate regions based on the information sensed by the IMU.

The method may include: obtaining an initial position in the map information, wherein the estimating of the candidate region comprises estimating the candidate region based on the initial position.

The estimating of the current position may include: generating a second local map based on the second image information; and estimating the current position in the candidate region by comparing the second local map to the map information.

The method may include: recognizing a position of a charging inlet of the target vehicle; determining whether wired charging with the target vehicle is available; supplying power to the target vehicle by leading a charging cable into the charging inlet of the target vehicle using a robot arm, in response to determination that wired charging is available; and wirelessly charging the target vehicle in response to determining that wired charging is not available.

The determining of whether wired charging with the target vehicle is available may include either one or both of: determining whether a wired charging function of the target vehicle is functional; and determining whether the charging inlet of the target vehicle is obstructed.

The determining of whether the charging inlet of the target vehicle is obstructed may include determining a distance between the charging inlet of the target vehicle and a neighboring object, and wherein the determining of whether wired charging with the target vehicle is available comprises determining that wired charging is not available in response to the distance being less than or equal to a predetermined distance.

The wirelessly charging of the target vehicle may include aligning a primary coil included in a wireless charging device of the vehicle charging robot with a central axis of a secondary coil included in the target vehicle.

The method may include obtaining the map information and the target position through vehicle-to-everything (V2X) communication.

The method may include calculating a charging fee of the target vehicle.

The method may include moving to an initial position in response to determining that a charging of the target vehicle is completed.

A non-transitory computer-readable storage medium may store instructions that, when executed by one or more processors, cause the one or more processors to perform the method.

In another general aspect, a vehicle charging robot includes: one or more image sensors configured to generate first image information and second image information; an inertial measurement unit (IMU) configured to measure an acceleration; a communication module configured to obtain map information and a target position; and one or more processors configured to estimate a candidate region for a current position in the map information based on information sensed by the IMU and the first image information received from the image sensor, estimate the current position in the candidate region based on the second image information received from the one or more image sensors, and control a movement of the vehicle charging robot based on the target position and the current position.

The vehicle charging robot of claim 16, wherein the one or more processors may be configured to reset a cumulative error of the IMU based on the current position at a predetermined time interval.

The vehicle charging robot of claim 16, wherein the one or more processors may be configured to generate a first local map based on the first image information, generate one or more candidate regions for the current position by comparing the first local map to the map information, and select the candidate region for the current position from among the one or more candidate regions based on the information sensed by the IMU.

The one or more processors may be configured to obtain an initial position in the map information, and estimate the candidate region based on the initial position.

The one or more processors may be configured to generate a second local map based on the second image information and the candidate region, and estimate the current position in the candidate region by comparing the second local map to the map information.

The vehicle charging robot may include either one or both of a radar sensor and a temperature sensor, wherein a position of an obstacle is determined using either one or both of the radar sensor and the temperature sensor.

The vehicle charging robot may include: a wired charging device comprising: a charging cable configured to supply power to a target vehicle; a robot arm structurally connected to the charging cable and configured to lead the charging cable into a charging inlet of the target vehicle; a motor configured to control the robot arm to align the charging cable with a position of the charging inlet of the target vehicle; and a control cable configured to control the charging cable to be led into the charging inlet of the target vehicle while maintaining a predetermined entry angle.

The vehicle charging robot may include a transporter configured to move the vehicle charging robot to the target position and move the vehicle charging robot to an initial position after charging of the target vehicle is completed.

In another general aspect, a processor-implemented robot control method includes: estimating one or more potential regions of a robot based on a map of a surrounding area of the robot and an object detected within a first radius of the robot; selecting, as a region of the robot, one of the one or more potential regions based on inertial information of the robot; determining a current position of the robot within the selected region based on a second object detected within a second radius of the robot; and controlling a movement of the robot based on the current position.

Other features and aspects will be apparent from the following detailed description, the drawings, and the claims.

Figure 1:
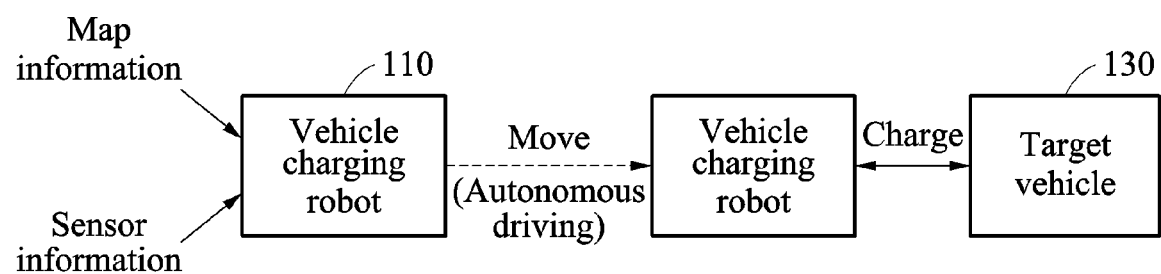
FIG. 1 illustrates an example of an operation of a vehicle charging robot.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, the examples will be described in detail with reference to the accompanying drawings, wherein like drawing reference numerals are used for like elements.

FIG. 1 illustrates an example of an operation of a vehicle charging robot.

A vehicle charging robot 110 may be an electric vehicle charging device capable of autonomous driving. For example, the vehicle charging robot 110 is a driverless vehicle capable of autonomous driving. However, the vehicle charging robot 110 is not limited thereto and various modifications may be made thereto depending on a design intent.

A target vehicle 130 may be an electric vehicle requiring supply of electrical energy. The electric vehicle may be a vehicle which obtains driving energy from electrical energy and includes an electric motor and a battery. The electric vehicle may be either one of an electricity-only vehicle which obtains driving power only from electrical energy, and a hybrid vehicle which operates using both electrical energy and another energy such as fuel and hydrogen. The target vehicle 130 may be parked in a predetermined parking space such as a parking lot. The parking lot may be either one or both of an indoor parking lot and an outdoor parking lot, and the parking lot may also refer to, in addition to a place explicitly named a parking lot, any place with a space for parking a vehicle.

Referring to FIG. 1, the vehicle charging robot 110 may move to a position of the target vehicle 130 through autonomous driving based on either one or both of map information and sensor information. The position of the target vehicle 130 will be referred to as a target position. The vehicle charging robot 110 reaching the target position may supply electrical energy to the target vehicle 130.

The vehicle charging robot 110 may operate in any space. For example, the vehicle charging robot 110 operates in a situation in which global positioning system (GPS) signals cannot be received (for example, in an indoor parking lot) or even in an environment in which GPS signals are unavailable due to various factors. Thus, the vehicle charging robot 110 may advantageously be utilized in a wider range of locations compared to a typical GPS-based autonomous driving robot.

The vehicle charging robot 110 may be disposed in a space in which charging of an electric vehicle is needed (for example, a parking lot). A suitable number of vehicle charging robots may be disposed in the parking lot based on the charging and discharging performance of the vehicle charging robot 110 and the number of electric vehicles corresponding to a capacity of the parking lot.

In an example in which electrical energy is supplied to the target vehicle 130 using the vehicle charging robot 110 capable of autonomous driving, electric vehicles may be charged using fewer vehicle charging robots 110 than electric vehicles, as each vehicle charging robot 110 may move from electric vehicle to electric vehicle, and thus a cost is advantageously reduced compared to a typical electric vehicle charging system wherein a charging station is fixed at a single parking space and, to charge a plurality of vehicles parked in different parking spaces, an equal number of charging stations are required.

The vehicle charging robot 110 may be charged at its own charging station until a request for charging an electric vehicle is provided from a user. A position of the charging station may be an initial position for autonomous driving of the vehicle charging robot 110. Map information of the parking lot may be obtained in advance at the charging station.

The vehicle charging robot 110 may receive a request for charging a target vehicle from the user. For example, the user may input the request for charging the target vehicle using an application installed on a smart device (e.g., a cellular phone, a computer, or a center console device of the target vehicle). The vehicle charging robot 110 may obtain a target position corresponding to a position at which the target vehicle is parked, and move to the target position through autonomous driving. The vehicle charging robot 110 may charge the target vehicle (once the vehicle charging robot 110 reaches the target position) and may calculate a charging fee of the target vehicle. For example, the vehicle charging robot 110 may notify the user of the charging fee through the user terminal. When charging of the target vehicle is completed, the vehicle charging robot 110 may return to the initial position or move to a subsequent target position to charge a subsequent target vehicle.

Figure 2:
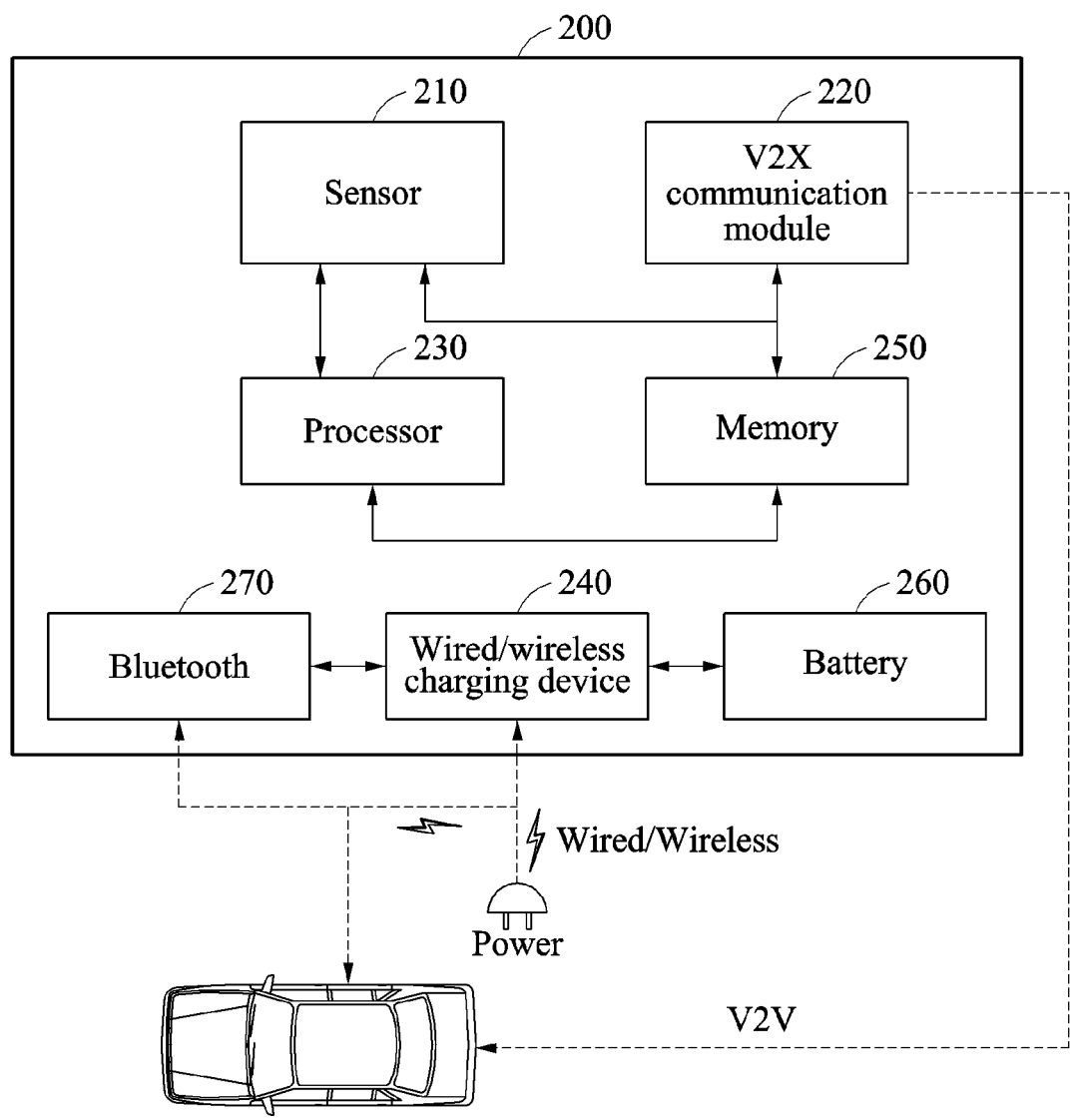
FIG. 2 illustrates an example of a vehicle charging robot.

FIG. 2 illustrates an example of a vehicle charging robot.

Referring to FIG. 2, a vehicle charging robot 200 may include a sensor 210, a communication module 220, and/or a processor 230. The vehicle charging robot may further include a wired/wireless charging device 240, a memory 250, a battery 260, and/or a Bluetooth module 270.

The sensor 210 may include an image sensor and/or an inertial measurement unit (IMU). The sensor 210 may further include a radar sensor, a lidar sensor, and/or a temperature sensor. The temperature sensor may include a thermal infrared (IR) sensor.

The image sensor is, for example, a camera. The image sensor is provided in a vehicle charging robot capable of autonomous driving to acquire image information corresponding to a space in a vicinity of the vehicle charging robot, for example, roads on which the vehicle charging robot is travelling, and traffic signs.

The IMU is a device which measures an acceleration, and includes acceleration sensors, gyro sensors, and/or magnetic sensors. The IMU recognizes a situation in which a moving object and a pedestrian move using accelerometers, gyroscopes, magnetometers, and/or altimeters.

The radar sensor recognizes a neighboring vehicle or obstacle using radio waves. The temperature sensor recognizes a neighboring vehicle or obstacle by sensing heat of an object.

The lidar sensor recognizes a neighboring vehicle or obstacle using light.

The communication module 220 is, for example, a vehicle-to-everything (V2X) communication module. V2X communication technology refers to technology in which a vehicle exchanges information with another vehicle and an infrastructure such as a road through wired/wireless networks. V2X communication includes vehicle-to-vehicle (V2V), vehicle-to-infrastructure (V2I), and vehicle-to-network (V2N) communications.

V2V is technology for wirelessly exchanging information between vehicles. For example, a target position is exchanged between the vehicle charging robot and the target vehicle through V2V communication.

V2I is technology for wirelessly exchanging information between a vehicle and a road infrastructure. For example, a type of base station capable of exchanging information with the communication module 220 in the vehicle charging robot through V2I communication is installed to collect driving information from the vehicle charging robot, and a central server analyzes the driving information and provides a result of the analyzing to the vehicle charging robot.

V2N is technology for wirelessly exchanging information between a vehicle and a mobile device. For example, V2N is technology for connecting devices such as a navigation system in a vehicle to a variety of mobile devices such as a smart phone and/or a tablet, wherein individuals carrying mobile devices exchange information with each other, and alarming sounds are generated and provided to both individuals when a vehicle and a pedestrian approach each other to prevent an accident.

The memory 250 may store data to support various functions of the vehicle charging robot. The memory 250 may store instructions, data for an operation of the vehicle charging robot, and/or various application programs to be run on the vehicle charging robot. At least a portion of the application programs is downloaded from an external server through wireless communication, or is already present on the vehicle charging robot at a time of release. The application programs may be stored in the memory 250, installed on the vehicle charging robot, and run by the processor 230 to perform the operation or function of the vehicle charging robot.

The processor 230 may control an overall operation of the vehicle charging robot, in addition to operations related to the application programs. The processor 230 processes signals, data, information, or images input or output through the elements described above, or runs the application programs stored in the memory 250, thereby providing or processing a function or information suitable for the user.

The wired/wireless charging device 240 may supply the power stored in the battery 260 to the target vehicle. For example, the wired/wireless charging device 240 includes a robot arm of a structure for wired charging of the target vehicle. Example structures of the wired/wireless charging device 240 will be described further below.

The Bluetooth module 270 may perform a short-range communication with the target vehicle. For example, the Bluetooth module 270 receives information related to the target vehicle or transmits a request for opening a charging inlet of the target vehicle. For ease of description, the Bluetooth module 270 is provided as an example. However, in addition to Bluetooth, various short-range communication technologies are applicable.

The vehicle charging robot 200 may further include a transporter configured to move to the target position and move to the initial position or a subsequent target position after charging of the target vehicle is completed.

The vehicle charging robot 200 may supply power to the target vehicle through autonomous driving even in an environment in which GPS signals cannot be received. Hereinafter, example methods of controlling the vehicle charging robot 200 will be described further.

Figure 3:
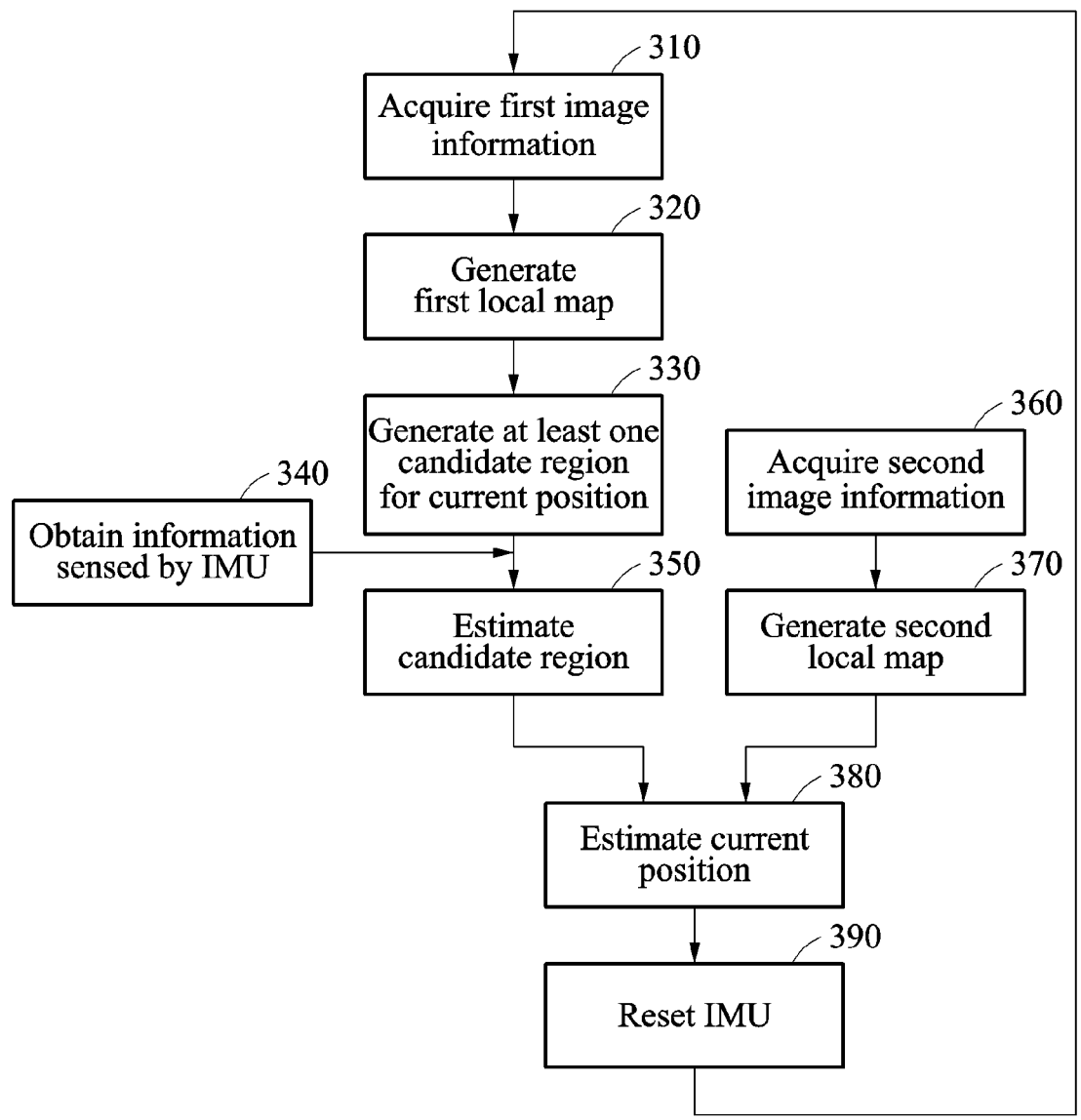
FIG. 3 illustrates an example of a method of controlling a vehicle charging robot.

FIG. 3 illustrates an example of a method of controlling a vehicle charging robot.

A current position of a vehicle charging robot is estimated using an image sensor and an IMU complementarily. In a typical position estimation scheme using an IMU, errors are accumulated as an iteration of position estimation increases, for example, as time passes or as a travelling distance increases. An accuracy of the typical position estimation scheme thus decreases as the errors are accumulated. In contrast to the typical position estimation scheme, if a cumulative error of an IMU of the vehicle charging robot is diminutive, the vehicle charging robot may supplement information acquired from the image sensor using information obtained from the IMU; and if the cumulative error of the IMU is significant, the vehicle charging robot may reset the cumulative error of the IMU based on the information acquired from the image sensor. Accordingly, in contrast to the typical position estimation scheme, the vehicle charging robot of the present application may correct for cumulative error and thereby an accuracy of an estimated position is increased. The vehicle charging robot determines a time point for resetting the cumulative error of the IMU based on information indicating the iteration of position estimation (for example, a position estimation count, the time, and/or the travelling distance). The vehicle charging robot periodically resets the cumulative error of the IMU. Example operations of resetting the cumulative error of the IMU will be described further with reference to FIGS. 6 and 7.

The scheme of using the image sensor and the IMU complementarily may be modified in various manners. For example, if a reliability of the information obtained from the IMU is higher than a reliability of the information acquired from the image sensor, the current position is estimated by correcting the information acquired from the image sensor with the information obtained from the IMU. Conversely, if errors of the IMU are accumulated and the reliability of the information obtained from the IMU is lower than the reliability of the information acquired from the image sensor, the current position of the vehicle charging robot is estimated through the information acquired from the image sensor, and the IMU is reset.

Image information may be acquired from the image sensor. The image information is information included in an image captured by the image sensor. The image information includes first image information containing information related to objects positioned within a first distance from the vehicle charging robot and second image information containing information related to objects positioned within a second distance from the vehicle charging robot. The first distance is greater than the second distance. The first image information and the second image information may be acquired respectively by different image sensors or by the same image sensor which is set differently. In an example, the first image information and the second image information are extracted from a single piece of image information acquired from a single image sensor.

In an example, only a portion within a predetermined search radius in the image captured through the image sensor is used as the image information. For example, a camera for an autonomous vehicle detects an object within a distance of about 100 meters (m) and a pedestrian within a distance of about 40 m. In a case of a 40-m search radius, information within a radius of 40 m in the captured image is acquired as the image information.

The image sensor may precisely estimate the current position by using a plurality of pieces of image information. For example, the image sensor extracts an approximate current position region through image information with a relatively wide image recognition radius, and extracts a precise current position through image information with a relatively narrow image recognition radius.

As described above, the image information may be divided into the first image information and the second image information depending on a search radius. A search radius of the first image information may be wider than a search radius of the second image information. For example, the search radius of the first image information is 20 m, and the search radius of the second image information is 4 m. The search radiuses of 20 m and 4 m are examples only and thus, the search radiuses are not limited thereto. The search radiuses are determined based on an area of a parking lot and a performance of the camera.

In another example, the first image information is image information acquired through a first camera, and the second image information is image information acquired through a second camera. When two cameras, the first camera and the second camera, are used, an angle of view of the second image information may be greater than an angle of view of the first image information. When image information having a wider angle of view is used, a greater amount of information is obtained.

A processor may generate a local map based on the image information. The local map is a map generated based on the image information, the map including features extracted within a range of the image information. A local map generated based on the first image information is a first local map, and a local map generated based on the second image information is a second local map. The vehicle charging robot may obtain map information corresponding to the whole region of the parking lot by downloading the map information in advance. The local map may be a map including information of a predetermined range generated as the vehicle charging robot operates, and the local map may be compared to the map information obtained in advance to extract information related to the current position.

Referring to FIG. 3, a method of estimating the current position of the vehicle charging robot may include any one or any combination of any two or more of operation 310 of acquiring the first image information, operation 320 of generating the first local map based on the first image information, operation 330 of generating at least one candidate region for the current position by comparing the first local map to the map information obtained in advance (for example, a dynamic precise map), operation 340 of obtaining information sensed by the IMU, operation 350 of estimating a candidate region for the current position according with the sensed information (from among the at least one candidate region), operation 360 of acquiring the second image information, operation 370 of generating the second local map based on the second image information, operation 380 of estimating the current position included in the candidate region by comparing the second local map to the map information obtained in advance, and operation 390 of resetting a cumulative error of the IMU based on the current position.

Figure 4:
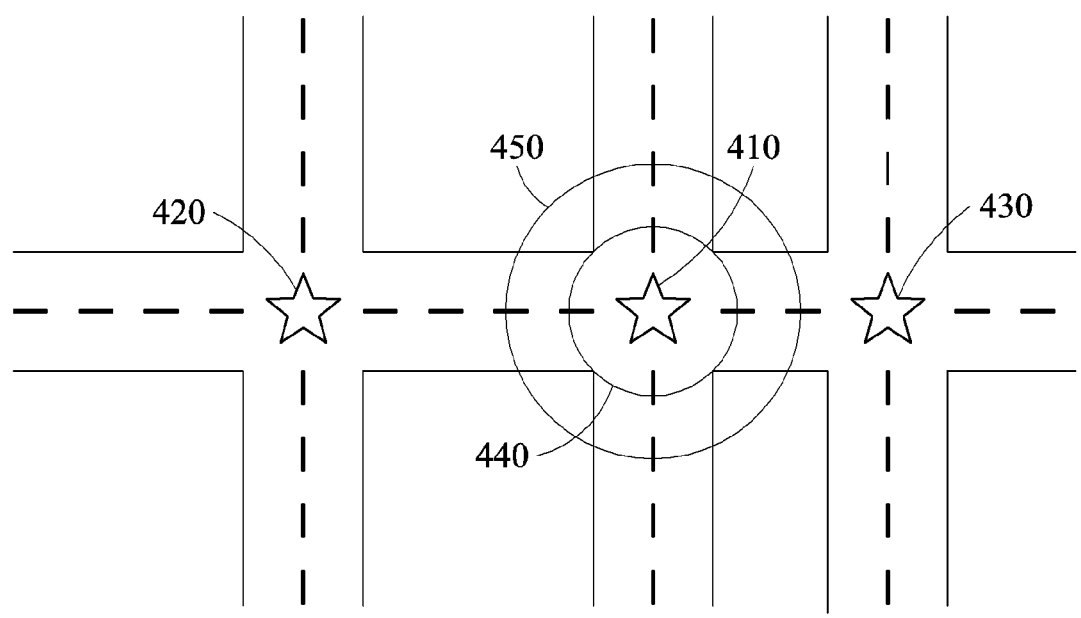
FIG. 4 illustrates an example of estimating a current position using an image sensor.

FIG. 4 illustrates an example of estimating a current position using an image sensor (e.g., estimating the current position using the image sensor without using an IMU).

Referring to FIG. 4, a vehicle charging robot may acquire first image information 450 and second image information 440 using an image sensor. The vehicle charging robot may operate in an area in which similar geographic features are repeated, such as a parking lot. For example, the vehicle charging robot operates in a parking lot having a structure in which parking spaces, driveways, and sidewalks are repeated at predetermined intervals.

An error of current position estimation may decrease as a search radius of image information decreases. For example, the error is 1 m (e.g., accurate to within 1 m) when the search radius of image information is 20 m, the error is 25 centimeters (cm) when the search radius of image information is 10 m, and the error is 4 cm when the search radius of image information is 4 m, which shows that an error rate decreases from 5%, to 2.5%, and to 1%, respectively.

The vehicle charging robot extracts information related to the current position through a comparison between the map information obtained in advance and the local map generated through the image sensor.

In an environment in which the vehicle charging robot operates, for example, in an environment in which similar geographic features are repeated like a parking lot, at least one candidate region for the current position is detected during a process of mapping the local map to the map information. For example, when comparing the first local map generated based on the first image information 450 to the map information obtained in advance, a position 420, a position 410, and a position 430 are detected as candidate regions for the current position.

The vehicle charging robot may use an IMU to select one of the candidate regions.

Figure 5:
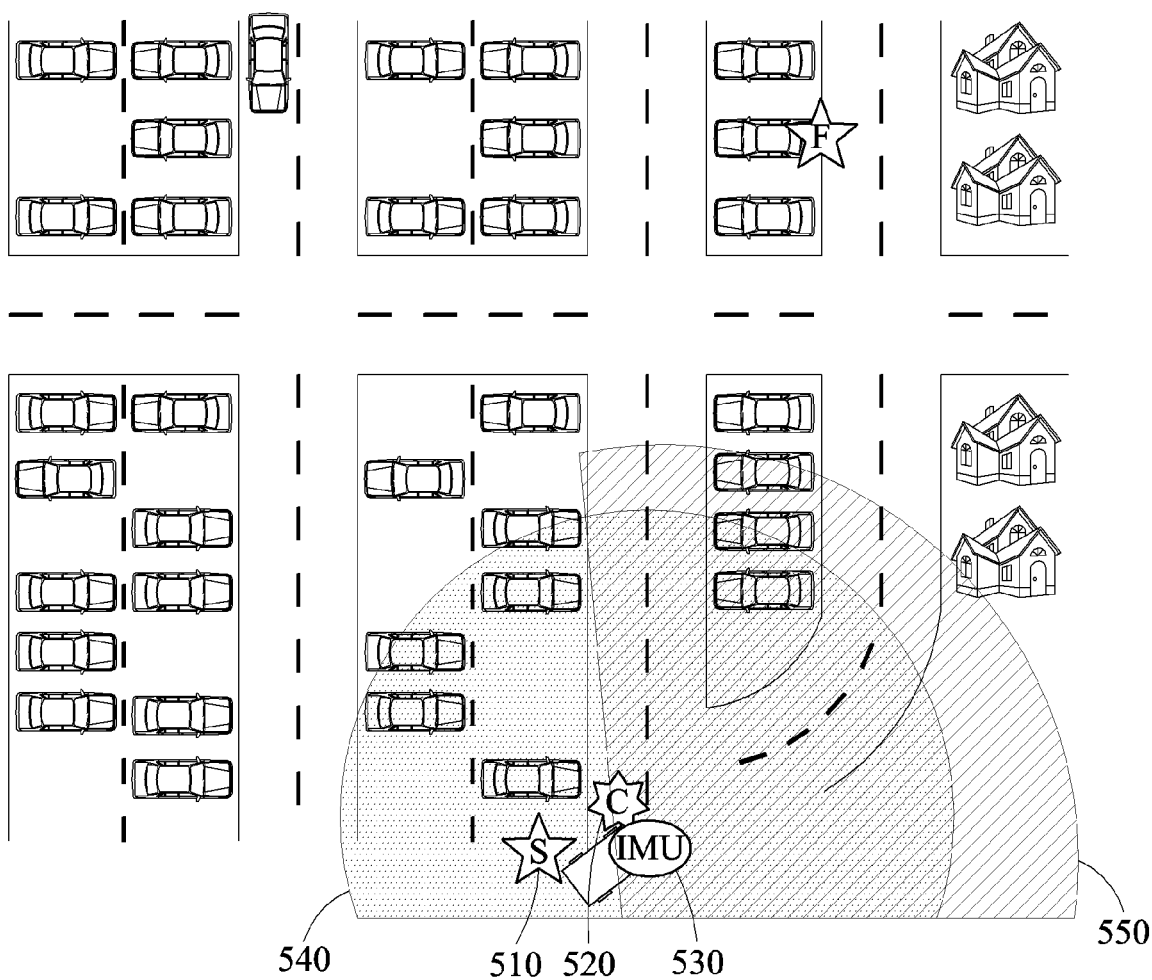
FIG. 5 illustrates an example of estimating a candidate region using an inertial measurement unit (IMU).

FIG. 5 illustrates an example of estimating a candidate region using an IMU.

Referring to FIG. 5, a vehicle charging robot obtains map information and obtains an initial position 510 in the map information.

The vehicle charging robot may obtain first image information 550 and generate a first local map based on the first image information 550. The generated first local map may be compared to map information obtained in advance. Referring to FIG. 5, since the vehicle charging robot operates in a parking lot having a structure in which parking spaces, driveways, and sidewalks are repeated at predetermined intervals, at least one candidate region for a current position is generated.

An IMU recognizes a situation in which a moving object and a pedestrian move using accelerometers, gyroscopes, magnetometers, and/or altimeters. Since the initial position 510 is known, a current position 530 is estimated using the IMU based on a movement of the vehicle charging robot. The current position 530 is estimated using the IMU based on the initial position 510, and a candidate region 520 is also estimated using the IMU based on the initial position 510.

Among at least one candidate region for the current position generated based on the first image information 550, a region including the current position 530 estimated using the IMU is estimated as a selected candidate region 520 for the current position. The expression "candidate region for the current position" is used instead of "the current position"

since an error of current position estimation performed based on the first image information 550 is greater than an error of current position estimation performed based on the second image information 540.

When a candidate region 520 for the current position according with the information sensed by the IMU is estimated or selected from among the at least one candidate region for the current position, the current position is then estimated within the selected candidate region based on the second image information 540. For example, the vehicle charging robot generates a second local map based on the second image information 540. The vehicle charging robot estimates the current position of the vehicle charging robot in the selected candidate region by comparing the second local map to the map information obtained in advance and mapping the second local map to the map information.

The vehicle charging robot primarily generates a number of candidate regions for the current position through the first image information, specifies or selects one of the candidate regions for the current position using the information sensed by the IMU, and estimates an accurate current position through the second image information. However, the IMU has a problem in that errors thereof are accumulated as time passes. When these errors are accumulated, a position information estimated by a typical position estimation scheme using the IMU may be inaccurate, and thus an incorrect candidate region may be estimated. An error of the IMU will be described further with reference to FIG. 6.

Figure 6:
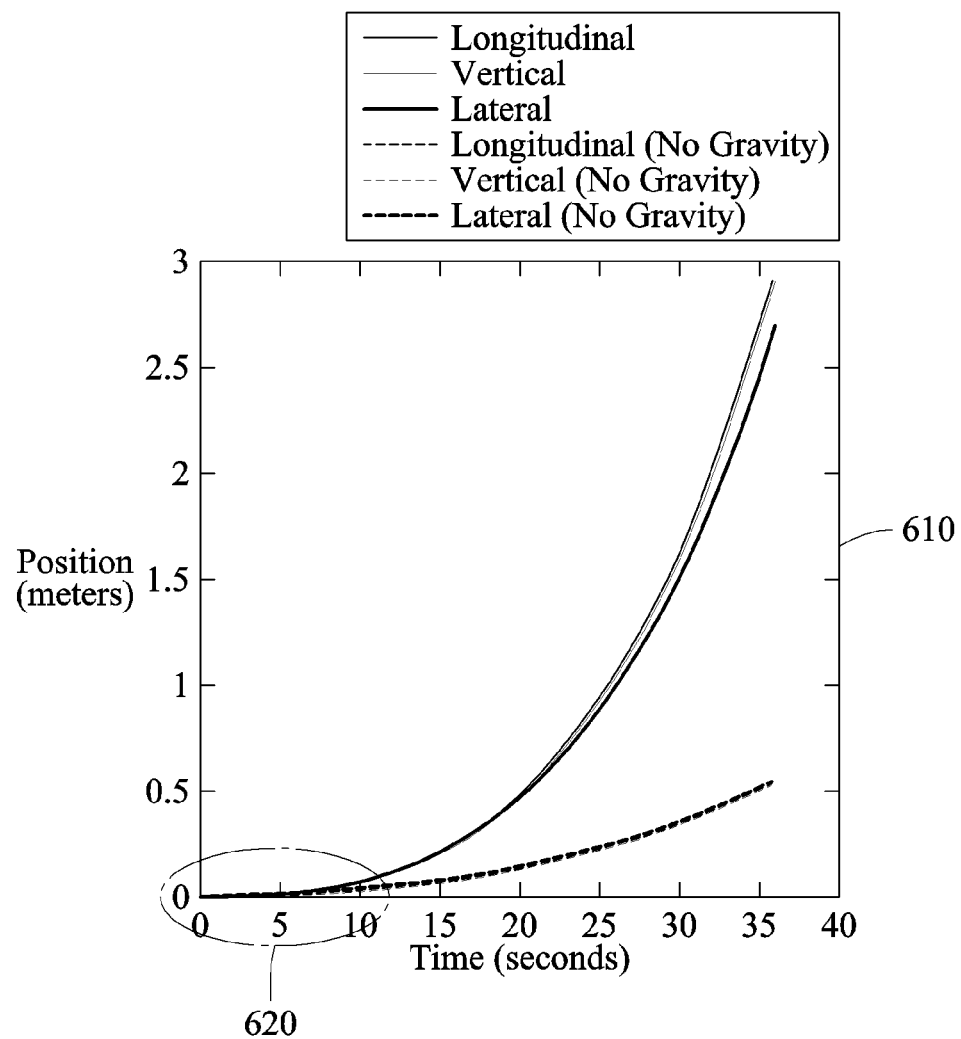
FIG. 6 illustrates an example of an error of a typical IMU over time.

FIG. 6 illustrates an example of an error of an IMU over time.

Referring to FIG. 6, errors of an IMU are accumulated as time passes, and information related to a position may not be substantially or reliably provided after a predetermined time elapses. Referring to a graph of FIG. 6, within 10 seconds after the IMU begins to operate, a difference between an actual position (e.g., Longitudinal, Vertical, and/or Lateral) and a position estimated by the IMU (e.g., Longitudinal (No Gravity), Vertical (No Gravity), and/or Lateral (No Gravity)) is less than 10 cm. However, the errors are accumulated as time passes. For example, when 30 seconds elapses after the IMU begins to operate, the difference between the actual position and the position estimated by the IMU is greater than or equal to 1 m. However, in response to a predetermined time elapsing, the vehicle charging robot of the present application may determine that position information estimated using the IMU is inaccurate. Thus, the vehicle charging robot may reset a cumulative error of the IMU at predetermined intervals. The vehicle charging robot may reset the cumulative error of the IMU based on a current position estimated using an image sensor. A related method will be described further with reference to FIG. 7.

Figure 7:
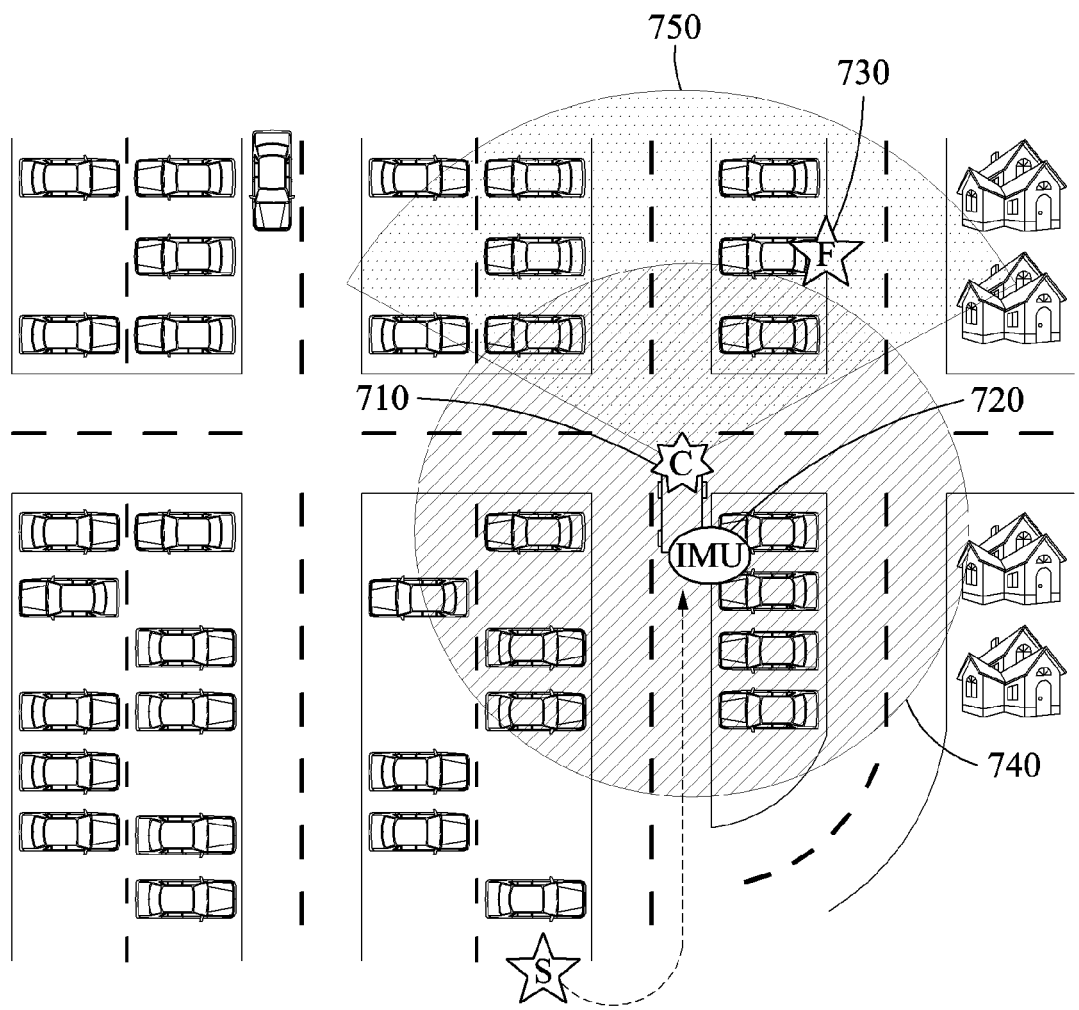
FIG. 7 illustrates an example of resetting a cumulative error of an IMU.

FIG. 7 illustrates an example of resetting a cumulative error of an IMU.

Referring to FIG. 7, in a state in which a predetermined time elapses after a vehicle charging robot operates, a current position 710 estimated by the vehicle charging robot using the method of FIG. 5 (e.g., a current position estimated based on generated candidate regions, first image information, and/or second image information, as described above with reference to FIG. 5) differs from a current position 720 estimated by a typical position estimation scheme using an IMU (e.g., a current position estimated using an IMU but without generating candidate regions, using first image information, and/or using second image information, as described above with reference to FIG. 5). As shown in FIG. 6, errors of the IMU are accumulated as time elapses. Thus, the current position 720 estimated using the IMU is inaccurate. The estimated current position 710 is a current position estimated based on second image information 740, and the second image information 740 is image information having a narrow search radius and has a relatively high accuracy with respect to current position estimation. If a predetermined time elapses, the vehicle charging robot may determine that the cumulative error of the IMU is greater than an error related to current position estimation based on second image information. For example, in a case of image information with a search radius of 4 m, the error is 4 cm, which is much less than the error in the position estimated using the IMU. When the predetermined time elapses, the vehicle charging robot may determine that the position information estimated using the IMU is more inaccurate than the position information estimated based on the image information. Thus, the vehicle charging robot may reset the cumulative error of the IMU at predetermined intervals. In another example, the vehicle charging robot may reset the cumulative error of the IMU when it is determined that a difference between a position estimated by the IMU and a position estimated based on the image information is greater than or equal to a preset threshold.

The vehicle charging robot autonomously moves to the target position 730 by iterating a process of obtaining map information and a target position 730 in the map information through V2X communication, generating at least one candidate region for a current position based on first image information 750, estimating a candidate region for the current position according with information sensed by the IMU among the at least one candidate region for the current position, estimating the current position 710 included in the candidate region based on the second image information 740, and resetting the cumulative error of the IMU.

The vehicle charging robot may charge a target vehicle after reaching a target position in response to an input from a user of the target vehicle.

A method of charging a target vehicle may include recognizing a position of a charging inlet of the target vehicle, determining whether wired charging is possible, supplying power to the target vehicle by leading a charging cable into the charging inlet of the target vehicle using a robot arm in response to determining that wired charging is possible (or available), and/or supplying power to the target vehicle by aligning a primary coil included in a wireless charging device with a central axis of a secondary coil included in the target vehicle for charging in response to determining that wired charging is impossible (or not available).

The charging cable of the vehicle charging robot is a device to provide power to an electric vehicle. The charging cable is connected to a power source, and an end thereof includes a connecting terminal to be connected to a charging inlet of the target vehicle.

The charging inlet of the target vehicle corresponds to a portion to be connected to the charging cable for charging the target vehicle.

An image sensor of the vehicle charging robot may be used to scan a region in a vicinity of the charging inlet of the target vehicle. One or more processors of the vehicle charging robot may detect a shape and/or a color of a quick response (QR) code, for example, formed on one side of the charging inlet, and may recognize the position of the charging inlet based on the detection of the QR code. Further, the position of the charging inlet of the target vehicle may be recognized based on information related to a type of the target vehicle and a stop position. The type of the target vehicle may be received from the user, received from the vehicle, determined based on the detected QR code, or stored in and received from a memory.

When the position of the charging inlet is recognized, whether wired charging is possible (or available) is determined. For example, whether wired charging is possible (or available) is determined based on any one of a distance between the charging inlet and a neighboring object (such as another vehicle), a functionality of a wired charging function of the target vehicle, and a charging time. For example, the vehicle charging robot may determine that the charging inlet is obstructed if the distance is less than or equal to a predetermined distance, and may therefore determine that wired charging is impossible (or unavailable). In another example, the vehicle charging robot may determine that a wired charging function of the target vehicle is broken or nonfunctional, and may therefore determine that wired charging is unavailable. Wired charging may have a better charging efficiency than wireless charging. Thus, in an example, when the vehicle charging robot determines that wired charging is possible, power is supplied to the target vehicle through wired charging, regardless of whether wireless charging is also possible.

In a case of wired charging, power may be supplied to the target vehicle by leading the charging cable into the charging inlet of the target vehicle using the robot arm of the vehicle charging robot. In response to the charging cable being led into and being received by the charging inlet, power is supplied to the target vehicle through the charging cable. The power supplied through the charging cable is used to charge a battery of the target vehicle.

The vehicle charging robot is advantageously configured to autonomously and accurately connect the charging cable to the charging inlet of the target vehicle, without requiring the intervention of a person. For example, a wired charging device of the vehicle charging robot is freely controlled by the vehicle charging robot in x, y, and z-axial directions based on the recognized position of the charging inlet, and the charging cable is thus accurately connected to the charging inlet of the target vehicle.

Figure 8:
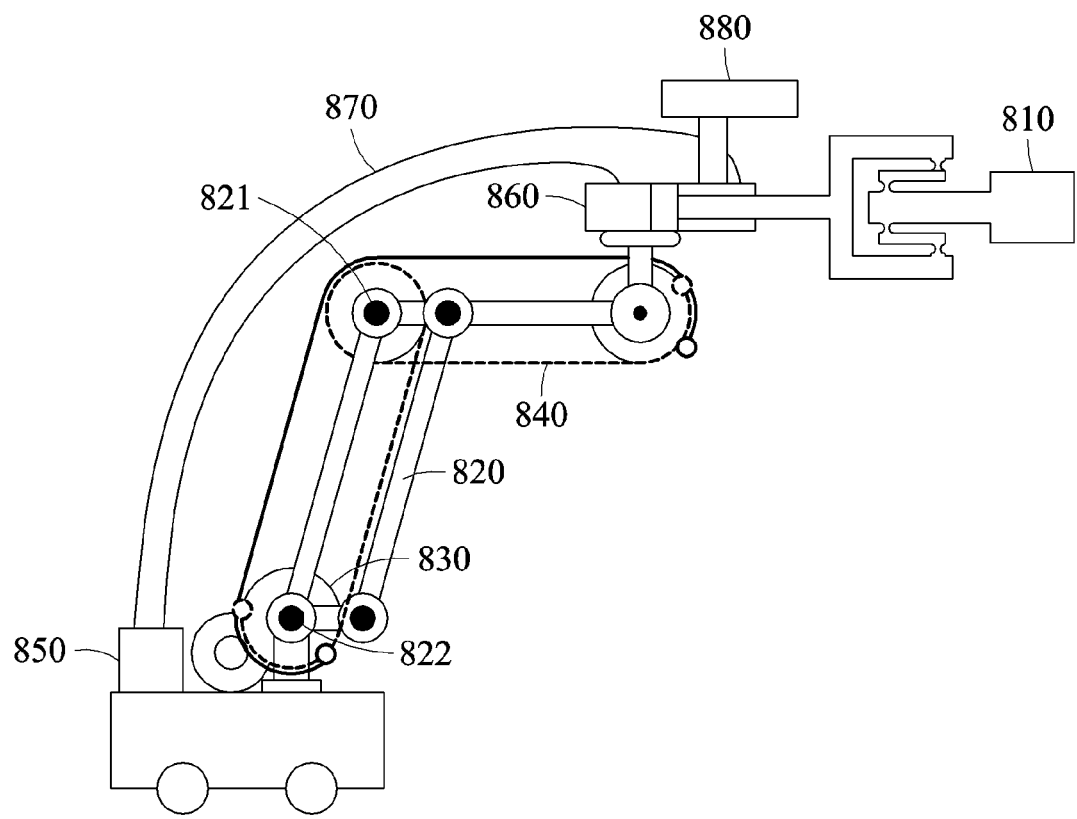
FIG. 8 illustrates an example of a wired charging device.

FIG. 8 illustrates an example of a wired charging device of the vehicle charging robot.

Referring to FIG. 8, a wired charging device may include a charging cable 810, a robot arm 820, a motor 830, and a control cable 840. The wired charging device may further include a pneumatic source 850, a pneumatic cylinder 860, a pneumatic cable 870, and a small-sized camera 880.

The robot arm 820 is structurally connected to the charging cable 810, and leads the charging cable 810 into a charging inlet of a target vehicle while maintaining a parallelogrammic structure. For example, the charging cable 810 may be connected to the robot arm 820 by a fastener, and a connecting terminal of the charging cable 810 to be connected to the charging inlet may be positioned at an end of the robot arm 820.

The motor 830 controls the robot arm 820 to align the charging cable 810 to a position of the charging inlet of the target vehicle. For example, the motor 830 moves the robot arm 820 through a controlling of joints of the robot arm 820. The robot arm 820 may have one, two, or more than two joints. In an example, there is a first joint 822 close to a lower end of the wired charging device (that is, the motor 830) and a second joint 821 close to an upper end of the wired charging device (that is, the charging cable 810). In a typical charging device including a robot arm, a first motor to control a first joint and a second motor to control a second joint may be needed separately. Further, in the typical charging device, the second motor to control the second joint may be attached to a position of the second joint, thereby increasing the weight of the robot arm, which restricts an operation of the robot arm.

In contrast to the typical charging device, the motor 830 may control both the first joint 822 and the second joint 821, and the motor 830 may be attached to a position of the first joint 822 so as not to restrict the operation of the robot arm 820. For example, by matching shafts of the first motor and the second motor, the weight of the robot arm 820 is advantageously reduced compared to the typical charging device.

In an example, the first motor drives a driving link between the first joint 822 and the second joint 821, and the second motor drives a driving link between the first joint 822 and a third joint 823. The robot arm 820 is connected to maintain a parallelogrammic shape using four driving links and four joints, thereby achieving an effect of controlling the second joint 821 through driving of the second motor. A motion of the robot arm 820 will be described in detail with reference to FIG. 9A.

The control cable 840 controls the charging cable 810 to be led into the charging inlet of the target vehicle while maintaining a predetermined entry angle.

The pneumatic source 850, the pneumatic cylinder 860, and the pneumatic cable 870 are used to insert the charging cable 810 aligned with the position of the charging inlet into the charging inlet.

The small-sized camera 880 scans a region in a vicinity of the charging inlet of the target vehicle to assist an image sensor of a vehicle charging robot such that the charging cable 810 is inserted more minutely and more accurately.

Figure 9A:
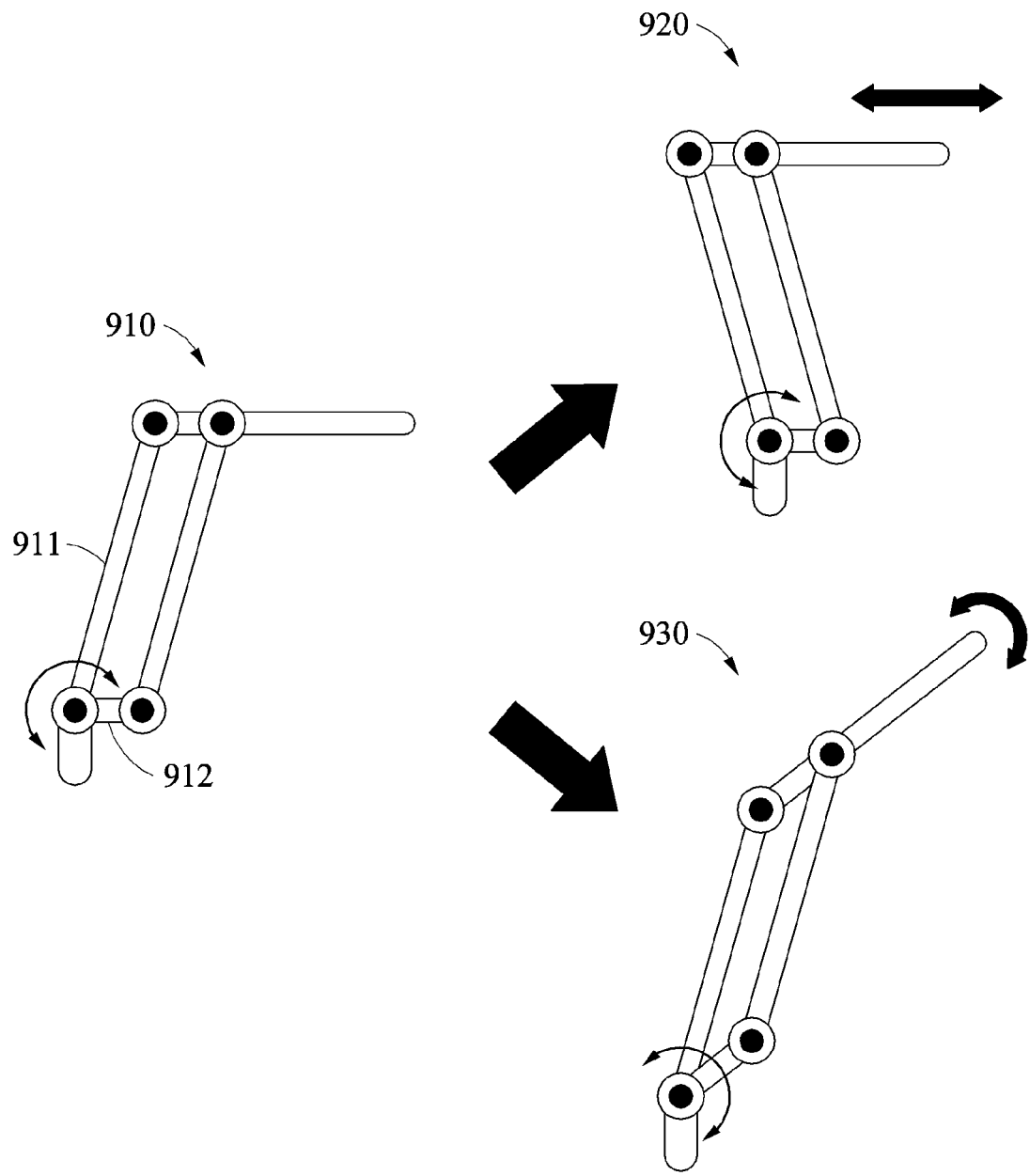
FIG. 9A illustrates an example of an operating method of a robot arm.

FIG. 9A illustrates an example of an operating method of a robot arm of the vehicle charging robot.

Referring to FIG. 9A, a robot arm may include a first driving link 911 and a second driving link 912. The robot arm may be controlled vertically and horizontally through controlling of the driving links. For example, by rotating the first driving link 911 of the robot arm and fixing the second driving link 912 in a basic state as shown in 910, the robot arm is controlled horizontally as shown in 920. As another example, by fixing the first driving link 911 of the robot arm and rotating the second driving link 912 in the basic state as shown in 910, the robot arm is controlled vertically as shown in 930. The vehicle charging robot may lead a charging cable into a charging inlet of a target vehicle by controlling the first driving link 911 and the second driving link 912.

Figure 9B:
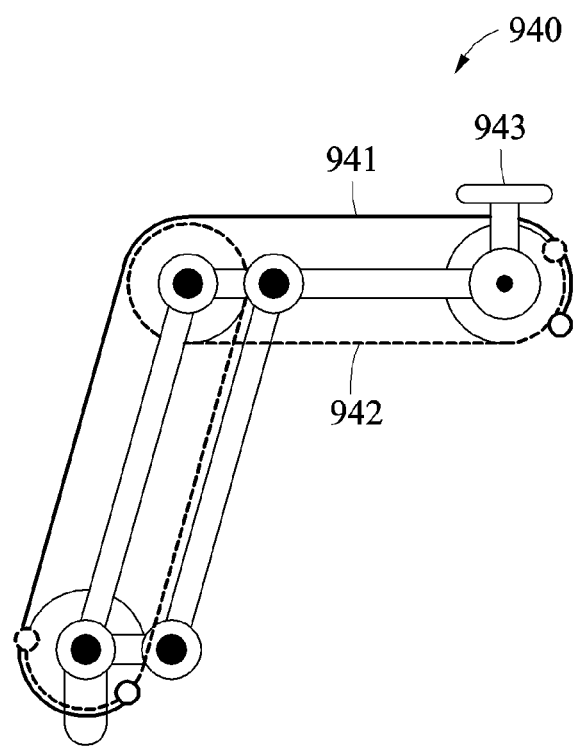
FIG. 9B illustrates an example of an operating method of a control cable.

FIG. 9B illustrates an example of an operating method of a control cable of the robot arm of the vehicle charging robot.

Referring to FIG. 9B, a control cable includes a first control cable 941 and a second control cable 942. In an example, an angle of the charging cable of the robot arm is maintained such that the charging cable is parallel to the ground in order to be connected to the charging inlet. The control cable is used to control the charging cable to be led into the charging inlet of the target vehicle while maintaining a predetermined entry angle. In detail, the control cable may be used to maintain a pose of an end effector 943 of a robot arm constantly. The end effector 943 is a terminal device to which the charging cable is connected. For example, when the robot arm moves upward, the second control cable 942 pulls down the end effector 943 to prevent the end effector 943 from moving upward, thereby maintaining the pose constantly. When the robot arm moves downward, the first control cable 941 pulls up the end effector 943 to prevent the end effector 943 from moving downward, thereby maintaining the pose constantly.

Figure 9C:
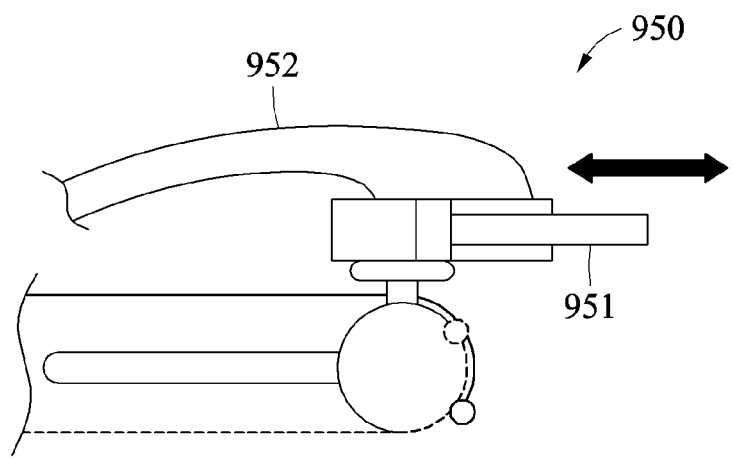
FIG. 9C illustrates an example of an operating method of a pneumatic cylinder.

FIG. 9C illustrates an example of an operating method of a pneumatic cylinder of the robot arm of the vehicle charging robot.

Referring to FIG. 9C, a pneumatic cylinder 951 is connected to a pneumatic source through a pneumatic cable 952. By installing the pneumatic source at a lower end (such as pneumatic source 850 of FIG. 8 installed at a base of the robot arm), the weight of a robot arm is advantageously reduced. The pneumatic cylinder 951 controls a charging cable aligned with a position of a charging inlet in a rectilinear direction so as to be connected to the charging inlet. The pneumatic cylinder 951 autonomously includes an air cushion to absorb an impact.

Figure 9D:
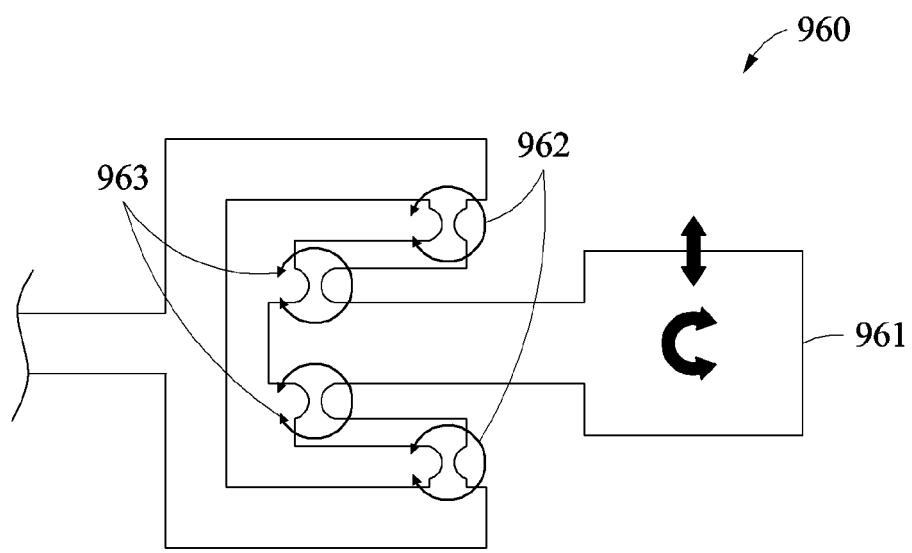
FIG. 9D illustrates an example of a structure of a charging cable.

FIG. 9D illustrates an example of a structure of a charging cable of the robot arm of the vehicle charging robot.

Referring to FIG. 9D, a charging cable 960 includes a charging plug 961, and the charging cable 960 is connected to a pneumatic cylinder. The charging plug 961 includes an elastic material and has a form half connected by connecting parts 962 and 963 having elasticity. The connecting parts 962 and 963 each include a connecting member between contact members at both ends. In this example, the length of the connecting member is shorter than the length of the contact members.

Since the charging plug 961 has the form half fixed to the pneumatic cylinder, the charging plug 961 is easily connected to the charging inlet. For example, the connecting parts 962 and 963 are formed of rubber such that the charging plug 961 is connected to the charging inlet when the charging plug 961 is approximately positioned in the vicinity of the charging inlet even when the charging plug 961 is not perfectly positioned at the charging inlet.

The vehicle charging robots, vehicle charging robots 110 and 200, sensor 210, communication module 220, processor 230, wired/wireless charging device 240, memory 250, battery 260, Bluetooth module 270 and other apparatuses, modules, devices, and other components described herein with respect to FIGS. 1-9D are representative of or implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9D that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented robot control method, the method comprising:
    determining a target position from map information;
    estimating a candidate region for a current position in the map information based on information sensed by an inertial measurement unit (IMU) and first image information received from an image sensor;
    estimating the current position in the candidate region based on second image information received from either the image sensor or another image sensor; and
    controlling a movement of a vehicle charging robot based on the target position and the current position.

2. The method of claim 1, further comprising:
    charging a target vehicle in response to the vehicle charging robot moving to the target position.

3. The method of claim 1, further comprising:
    resetting a cumulative error of the IMU based on the current position at a predetermined time interval.

4. The method of claim 1, wherein the first image information includes information associated with an object positioned within a first distance from the vehicle charging robot, the second image information includes information associated with an object positioned within a second distance from the vehicle charging robot, and the first distance is greater than the second distance.

5. The method of claim 1, wherein the estimating of the candidate region comprises:
    generating a first local map based on the first image information;
    generating one or more candidate regions for the current position by comparing the first local map to the map information; and
    selecting the candidate region for the current position from among the one or more candidate regions based on the information sensed by the IMU.

6. The method of claim 1, further comprising:
    obtaining an initial position in the map information,
    wherein the estimating of the candidate region comprises estimating the candidate region based on the initial position.

7. The method of claim 1, wherein the estimating of the current position comprises:
    generating a second local map based on the second image information; and
    estimating the current position in the candidate region by comparing the second local map to the map information.

8. The method of claim 1, further comprising:
    recognizing a position of a charging inlet of the target vehicle;
    determining whether wired charging with the target vehicle is available;
    supplying power to the target vehicle by leading a charging cable into the charging inlet of the target vehicle using a robot arm, in response to determination that wired charging is available; and
    wirelessly charging the target vehicle in response to determining that wired charging is not available.

9. The method of claim 8, wherein the determining of whether wired charging with the target vehicle is available comprises either one or both of:
    determining whether a wired charging function of the target vehicle is functional; and
    determining whether the charging inlet of the target vehicle is obstructed.

10. The method of claim 9,
    wherein the determining of whether the charging inlet of the target vehicle is obstructed comprises determining a distance between the charging inlet of the target vehicle and a neighboring object, and
    wherein the determining of whether wired charging with the target vehicle is available comprises determining that wired charging is not available in response to the distance being less than or equal to a predetermined distance.

11. The method of claim 8, wherein the wirelessly charging of the target vehicle comprises aligning a primary coil included in a wireless charging device of the vehicle charging robot with a central axis of a secondary coil included in the target vehicle.

12. The method of claim 1, further comprising:
    obtaining the map information and the target position through vehicle-to-everything (V2X) communication.

13. The method of claim 1, further comprising:
    calculating a charging fee of the target vehicle.

14. The method of claim 1, further comprising:
moving to an initial position in response to determining that a charging of the target vehicle is completed.

15. A non-transitory computer-readable storage medium storing instructions that, when executed by one or more processors, cause the one or more processors to perform the method of claim 1.

16. A vehicle charging robot, comprising:
one or more image sensors configured to generate first image information and second image information;
an inertial measurement unit (IMU) configured to measure an acceleration;
a communication module configured to obtain map information and a target position; and
one or more processors configured to estimate a candidate region for a current position in the map information based on information sensed by the IMU and the first image information received from the image sensor, estimate the current position in the candidate region based on the second image information received from the one or more image sensors, and control a movement of the vehicle charging robot based on the target position and the current position.

17. The vehicle charging robot of claim 16, wherein the one or more processors are configured to reset a cumulative error of the IMU based on the current position at a predetermined time interval.

18. The vehicle charging robot of claim 16, wherein the one or more processors are configured to generate a first local map based on the first image information, generate one or more candidate regions for the current position by comparing the first local map to the map information, and select the candidate region for the current position from among the one or more candidate regions based on the information sensed by the IMU.

19. The vehicle charging robot of claim 16, wherein the one or more processors are configured to obtain an initial position in the map information, and estimate the candidate region based on the initial position.

20. The vehicle charging robot of claim 16, wherein the one or more processors are configured to generate a second local map based on the second image information and the candidate region, and estimate the current position in the candidate region by comparing the second local map to the map information.

21. The vehicle charging robot of claim 16, further comprising:
either one or both of a radar sensor and a temperature sensor,
wherein a position of an obstacle is determined using either one or both of the radar sensor and the temperature sensor.

22. The vehicle charging robot of claim 16, further comprising:
a wired charging device comprising:
a charging cable configured to supply power to a target vehicle;
a robot arm structurally connected to the charging cable and configured to lead the charging cable into a charging inlet of the target vehicle;
a motor configured to control the robot arm to align the charging cable with a position of the charging inlet of the target vehicle; and
a control cable configured to control the charging cable to be led into the charging inlet of the target vehicle while maintaining a predetermined entry angle.

23. The vehicle charging robot of claim 16, further comprising:
a transporter configured to move the vehicle charging robot to the target position and move the vehicle charging robot to an initial position after charging of the target vehicle is completed.

* * * * *